(12) United States Patent
Wang et al.

(10) Patent No.: US 9,741,345 B2
(45) Date of Patent: Aug. 22, 2017

(54) METHOD FOR SEGMENTING VIDEOS AND AUDIOS INTO CLIPS USING SPEAKER RECOGNITION

(71) Applicant: Chunghwa Telecom Co., Ltd., Yangmei, Taoyuan County (TW)

(72) Inventors: Chun-Lin Wang, Yangmei (TW); Chi-Shi Liu, Yangmei (TW); Chih-Jung Lin, Yangmei (TW)

(73) Assignee: CHUNGHWA TELECOM CO., LTD., Yangmei, Taoyuan County (TW)

( * ) Notice: Subject to any disclaimer, the term of this patent is extended or adjusted under 35 U.S.C. 154(b) by 0 days.

(21) Appl. No.: 15/399,329

(22) Filed: Jan. 5, 2017

(65) Prior Publication Data

US 2017/0194003 A1  Jul. 6, 2017

Related U.S. Application Data

(63) Continuation-in-part of application No. 14/456,725, filed on Aug. 11, 2014, now abandoned.

(30) Foreign Application Priority Data

Aug. 15, 2013  (TW) .............................. 102129235 A

(51) Int. Cl.
*G10L 15/00* (2013.01)
*G10L 17/02* (2013.01)
(Continued)

(52) U.S. Cl.
CPC ............ *G10L 17/02* (2013.01); *G10L 15/063* (2013.01); *G10L 17/04* (2013.01); *G10L 17/08* (2013.01);
(Continued)

(58) Field of Classification Search
CPC ....... G10L 15/22; G10L 15/30; G10L 15/265; G10L 15/00; G10L 15/02; G10L 15/08;
(Continued)

(56) References Cited

U.S. PATENT DOCUMENTS

| 6,404,925 | B1 | 6/2002 | Foote et al. |
| 7,181,393 | B2 | 2/2007 | Lu et al. |
| 9,311,395 | B2 | 4/2016 | Kocks et al. |

FOREIGN PATENT DOCUMENTS

TW   I283375 B   7/2007

*Primary Examiner* — Vu B Hang
(74) *Attorney, Agent, or Firm* — Muncy, Geissler, Olds & Lowe, P.C.

(57) ABSTRACT

A method for segmenting video and audio into clips using speaker recognition is provided to segment audio according to speaker audio, and to make audio clips correspond to the audio and video signals to generate audio and video clips. The method instantly trains an independent speaker model by increasing an unknown speaker source audio signal, and the speaker recognition result is applied to determine the audio and video clips. Independent speaker clips of source audio are determined according to the speaker model and the speaker model is renewed according the independent speaker clips of source audio. This method segments audio by the speaker model without waiting for complete speaker feature audio signals to be collected. The method is also able to segment the audio and video into clips based on the recognition result of speaker audio, and can be used to segment TV audio and video into clips.

4 Claims, 13 Drawing Sheets

(51) Int. Cl.
  *G10L 17/04* (2013.01)
  *G10L 17/08* (2013.01)
  *G10L 15/06* (2013.01)
  *G10L 15/065* (2013.01)
  *G10L 15/26* (2006.01)
  *G10L 15/22* (2006.01)

(52) U.S. Cl.
  CPC ............ *G10L 15/065* (2013.01); *G10L 15/22* (2013.01); *G10L 15/265* (2013.01)

(58) Field of Classification Search
  CPC ... G10L 15/063; G10L 15/065; G10L 15/197; G10L 15/193; G10L 17/005; G10L 17/02
  USPC ....... 704/231, 236, 239, 243, 244, 246, 250, 704/255, 257, 270
  See application file for complete search history.

METHOD FOR SEGMENTING VIDEOS AND AUDIOS INTO CLIPS USING SPEAKER RECOGNITION

RELATED APPLICATIONS

This application is continuation-in-part application of U.S. patent application Ser. No. 14/456,725, filed on Aug. 11, 2014.

BACKGROUND OF THE INVENTION

1. Field of the Invention

The present invention is related to a technology of segmenting video and audio into clips. More particularly, the present invention is related to segmenting video and audio into clips using speaker recognition and dividing the audio and video.

2. Brief Description of the Related Art

Nowadays, as the time goes by, videos contain more and more information and are widely varied. It is an issue for the audience to quickly retrieve important contents from various and numerous videos. Generally, videos on the internet have been manually segmented and are easier for a user to retrieve the contents thereof. For dealing with numerous videos, it is important to develop a technology for automatically segmenting videos and audios.

Conventional technology for automatically segmenting audio and video is configured to use the video signals by detecting a particular image for analyzing and sorting first, and then segmenting the audio and video into clips. A conventional technology of "Anchor Person Detection For Television News Segmentation Based On Audiovisual Features" is disclosed in Taiwan Patent No. 1283375, as shown in FIG. 1. As shown in FIG. 1, the conventional technology comprises steps of: scanning pixels of video frames with a first horizontal scan line to determine if colors of the pixels fall within a predetermined color range; creating a color map utilizing pixels located on the first horizontal scan line from a plurality of successive video frames; labeling the current video segment as a candidate video segment if the color map indicates the presence of a stable region of pixels falling within the predetermined color range for a predetermined number of successive video frames; and performing histogram color comparisons on the stable regions for detecting shot transitions. Audio signals of the video clips may also be analyzed to further verify the candidate video segments. However, the conventional method uses the scan line for analyzing color distribution in videos, and depends on the pixels for segmenting videos. If the videos vary frequently, the accuracy is low.

Another conventional automatic segmenting method uses audio signals for segmenting of the videos. A conventional technology of "Method of real-time speaker change point detection, speaker tracking and speaker model construction" is disclosed in U.S. Pat. No. 7,181,393 B2, as shown in FIG. 2. The method comprises two stages. In the pre-segmenting stage, the covariance of a feature vector of each segment of speech is built initially. A distance is determined based on the covariance of the current segment and a previous segment; and the distance is used to determine if there is a potential speaker change between these two segments. If there is no speaker change, the model of current identified speaker model is updated by incorporating data of the current segment. Otherwise, if there is a speaker change, a refinement process is utilized to add additional audio characteristics to calculate a hybrid probability. A particular probability determination mechanism is then applied for confirming if there is a speaker change point. However, this method has to calculate distances of a plurality of audio characteristics in two next clips and requires large calculation capacity, which is difficult to apply.

SUMMARY OF THE INVENTION

The present invention is related to a method for segmenting video and audio into clips using speaker recognition. This method is able to segment audio according to speaker audio. This method is also able to make audio clips correspond to the audio and video signals to generate audio and video clips. The present invention dramatically simplifies the model training procedure by instantly training speaker model. In reference to conventional speaker recognition of collecting speaker audio signals in advance for training the speaker voice model, the present invention applies audio signals from the same source as the source audio and video signals for training speaker model, and is more convenient than the conventional art. The present invention applies an instant accumulation training method for training a speaker model, which is able to retrieve features of audio signals of independent speaker and able to quickly learn robust speaker audio model. This solves the issue of being unable to get speaker audio signals during instant training and the issue of being unable to get sufficient training model samples. The instant accumulation training method is able to segment audios by the speaker model without waiting to collect complete speaker feature audio signals. Thus, system lag due from collecting complete speaker feature audio signals is solved. In comparison with conventional methods which only detect audio and video by dependent speaker model, the present invention is able to detect independent speaker and corresponding audio and video by instant training speaker model, and the utility of the present invention is increased in speaker detecting technologies. The present invention uses instant training speaker model to reduce environment difference caused by conventional methods and to increase accuracy of speaker recognition. The present invention is also able to segment the audio and video into clips by recognition of speaker audio, which overcomes a conventional shortage of only being able to segment audio and video in an off-line mode. The present invention can also be applied to segmenting instant TV channel audio and video into clips.

The method for segmenting video and audio into clips of the present invention is to instantly train an independent speaker model by increasing an unknown speaker source audio signal, and the speaker recognition result is applied to determine the audio and video clips. The audio and video clips are repeated video and audio clips corresponding to a speaker, or video and audio clips which range between starting points of the repeated video and audio clips corresponding to the speaker. The method for segmenting video and audio into clips of the present invention comprises but is not limited to segmenting news video. The method for segmenting video and audio into clips of the present invention is configured to determine audio and video clips by a speaker model, and the speaker model can be a speaker instant training audio model of repeated video and audio clips corresponding to a speaker, such as a news anchor model. The method for segmenting video and audio into clips of the present invention comprises the steps of:

(1) instantly training the independent speaker model;
(2) determining the independent speaker clips of source audio according to the speaker model; and (3) renewing the speaker model according the independent speaker clips of source audio.

Step (1) of instantly training the independent speaker model further comprises retrieving an audio signal of the speaker having a predetermined time length from the source audio.

The length of the independent speaker clips of the source audio is longer than the length of the audio for training the speaker model. The step of determining the independent speaker clips of source audio according to the speaker model further comprises the steps of calculating similarity between the source audio and the speaker model and selecting clips being capable of similarity larger than a threshold value.

The present invention provides a method for segmenting video and audio into clips comprising the steps of instantly training an independent speaker model by increasing an unknown speaker source audio, and determining video and audio clips in response to the result of speaker recognition.

The video and audio clips are repeated video and audio clips corresponding to a speaker, which are video and audio clips ranging between starting points of the repeated video and audio clips corresponding to the speaker. The video and audio clips can comprise news video and the speaker model can be a news anchor model.

The present invention provides a method for segmenting video and audio into clips comprises the steps of:

A. instantly training the independent speaker model;

B. determining the independent speaker clips of source audio according to the speaker model; and C. renewing the speaker model according the independent speaker clips of source audio.

Step A of instantly training the independent speaker model may further comprise retrieving a predetermined time length audio signal of speaker from the source audio. The length of the independent speaker clips of source audio may be longer than the length of the audio for training the speaker model.

Step B may further comprise the steps of:

D. calculating similarity between the source audio and the speaker model; and

E. selecting clips being capable of similarity larger than a threshold value.

Step D of calculating similarity between the source audio and the speaker model is configured to calculate the probability of how similar the source audio is to the speaker model, according to the speaker model.

Further, the threshold value taken in Step E is adapted to be increased as the number of speaker audio signals increase.

The present invention provides a method for segmenting video and audio into clips and further comprises the steps of beforehand training a hybrid model, wherein the step of determining the independent speaker clips of source audio according to the speaker model further comprises the steps of:

F. calculating similarity between the source audio and the speaker model in reference to the hybrid model; and G. selecting clips being capable of similarity larger than a threshold value.

Further, the trained hybrid model is derived from retrieving arbitrary time interval hybrid audio signals of the non-source audio and then reading and training the hybrid audio signals as the hybrid model.

Further, the hybrid audio signals comprises a plurality of speakers' audio signals, music audio signals, advertising audio signals, and audio signals of interviewing news video.

Further, Step F of calculating similarity between the source audio and the speaker model in reference to the hybrid model is configured to calculate the similarity between the source audio and the speaker model and the similarity between the source audio and the hybrid model, respectively based on the speaker model and the hybrid model, and then subtracting the later similarity from the previous similarity.

The present invention provides a method for segmenting video and audio into clips, further comprising steps of beforehand training a hybrid model, renewing the hybrid model, wherein the step of determining the independent speaker clips of source audio according to the speaker model further comprises the steps of:

H. calculating similarity between the source audio and the speaker model in reference to the hybrid model; and I. selecting clips being capable of similarity larger than a threshold value.

Further, the step of renewing the hybrid model is configured to combine the hybrid audio signals which range between starting points of two segmented clips and the hybrid audio signal retrieved from non-source audio, and then training the hybrid audio signals as the hybrid model.

The present invention provides a method for segmenting video and audio into clips, further comprising the steps of decomposing the audio and video signals, looking for a speaker audio signal among audio signal features, making audio clips correspond to the audio and video signals, and playing the audio and video clips.

Further, the step of decomposing the audio and video signals is configured to decompose the audio and video signals into source audio and source video.

Further, the step of looking for a speaker audio signal among audio signal features comprises audio signal features of cue tone, keyword, and music.

Further, the step of making audio clips correspond to the audio and video signals is configured to make starting time code and ending time code of the audio clips to the audio and video signals respectively to generate audio and video clips.

Further, the step of playing the audio and video clips is configured to play the audio and video clips according to the starting time code and the ending time code of the audio clips.

DETAILED DESCRIPTION OF THE PREFERRED EMBODIMENT

Figure 1:
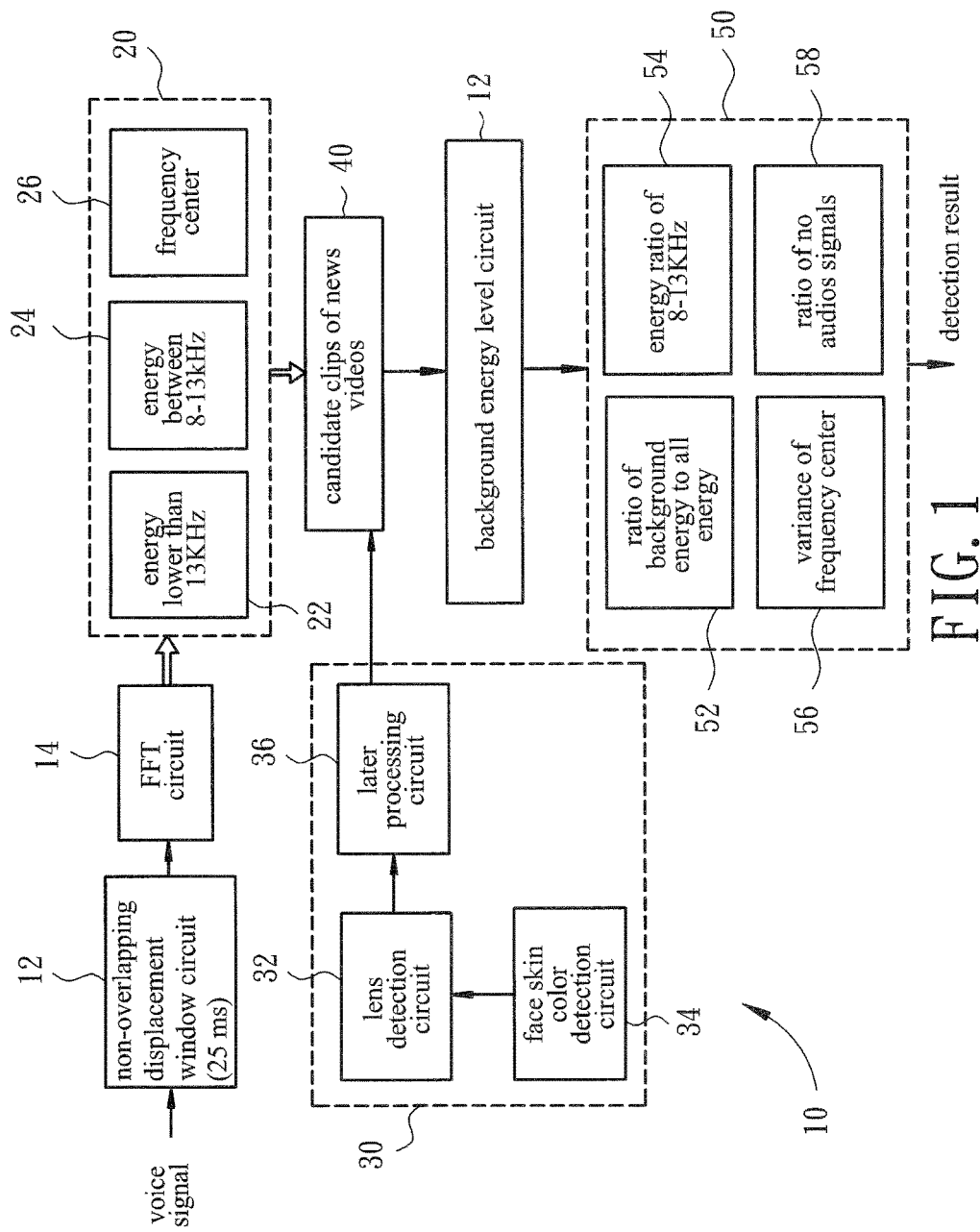
FIG. 1 shows a block diagram of conventional technology.
Figure 2:
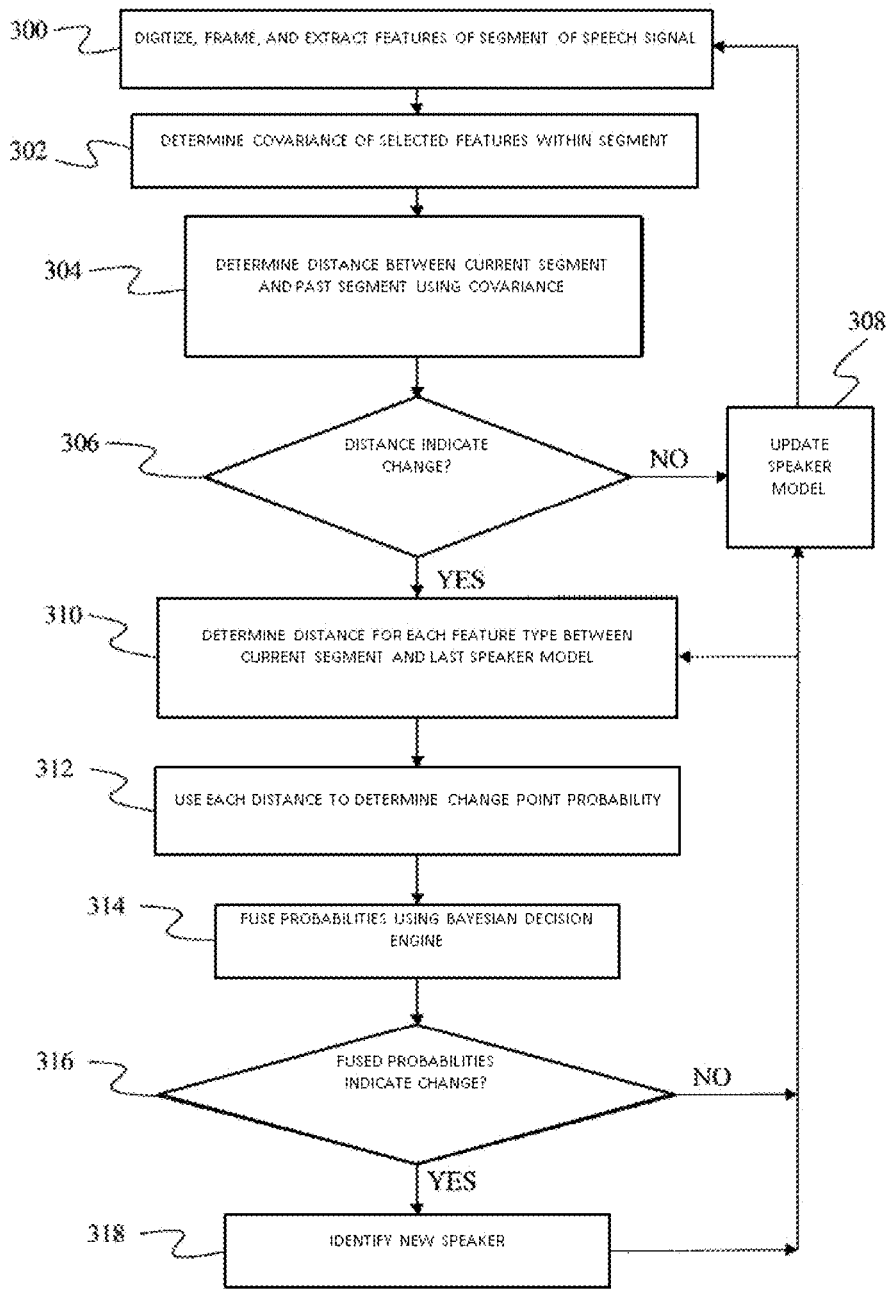
FIG. 2 shows a flow diagram of conventional technology.
Figure 3:
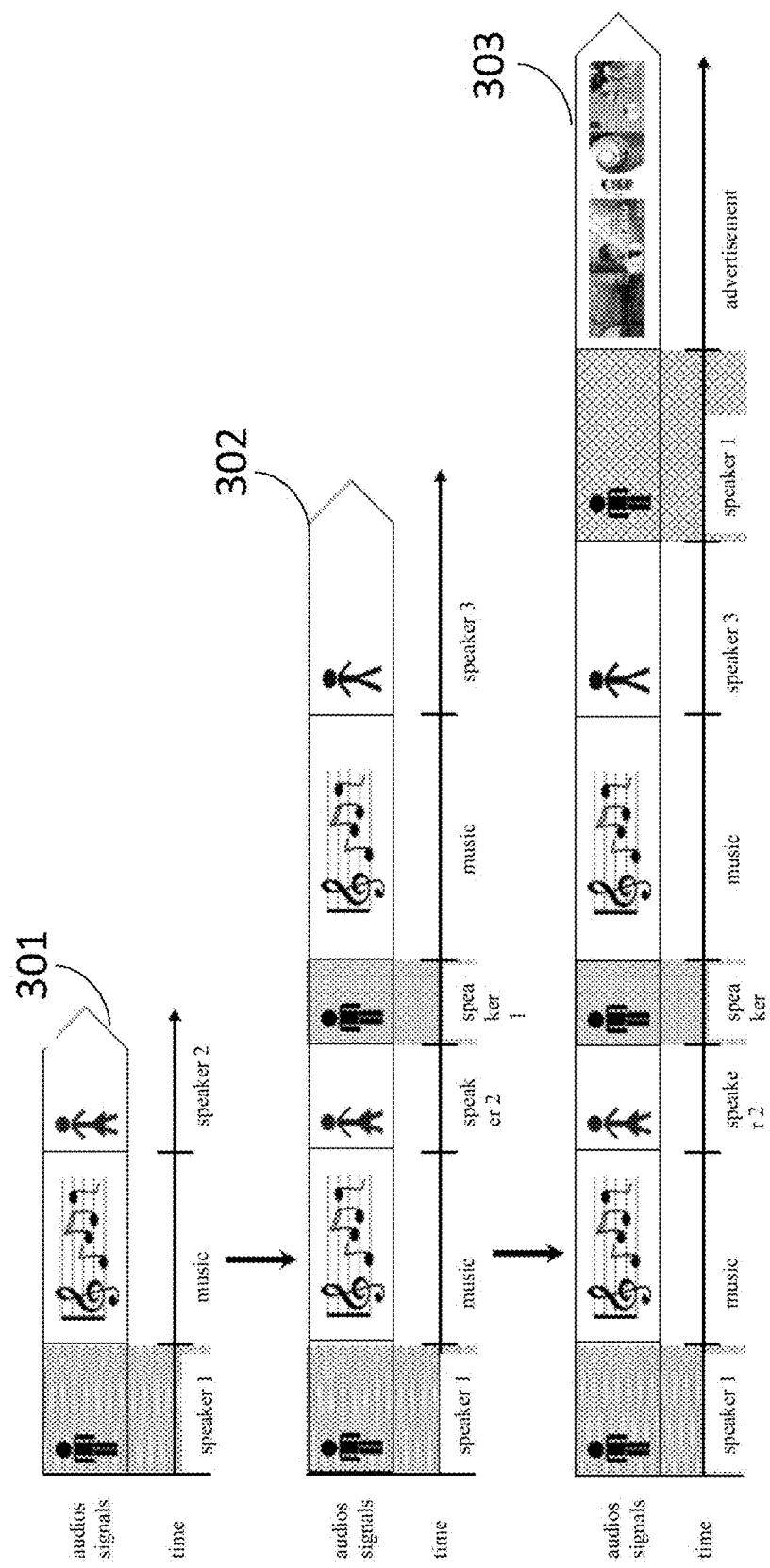
FIG. 3 shows increasing of unknown speaker source audio signals of the present invention.

The present invention provides a method for segmenting video and audio into clips comprising the steps of instantly training an independent speaker model by increasing unknown speaker source audio, and determining video and audio clips in response to result of speaker recognition. FIG. 3 shows increasing of unknown speaker source audio signals of the method for segmenting video and audio into clips of the present invention. The source audio signals increase as time passes. In FIG. 3, the length of audio signal 302 is longer than the length of audio signal 301, and the length of audio signal 303 is longer than the length of audio signal 302. The plaid pattern of audio signal 301 means that the independent speaker segment after a first speaker recognition, and the independent speaker segment, are adapted for instantly training the independent speaker model. Plaid patterns of audio signal 302 mean two independent speaker clips determined by speaker recognition after a first time training of independent speaker model, and the two independent speaker clips, are adapted for instantly training an independent speaker model. Plaid patterns of audio signal 303 mean three independent speaker clips determined by speaker recognition after a second time training of independent speaker model, and the three independent speaker clips are adapted for instantly training an independent speaker model. The number of independent speaker clips can be increased as the number of times speaker recognition is performed increases, and as the source audio of the independent speaker increases.

The present invention provides a method for segmenting video and audio into clips. The audio and video clips are repeated video and audio clips corresponding to a speaker or video and audio clips which range between starting points of the repeated video and audio clips corresponding to the speaker. The method for segmenting video and audio into clips of the present invention comprises but is not limited to segmenting news video. The method for segmenting video and audio into clips of the present invention is configured to determine audio and video clips by a speaker model, and the speaker model can be a speaker instant training audio model of repeated video and audio clips corresponding to a speaker, such as a news anchor model.

Figure 4:
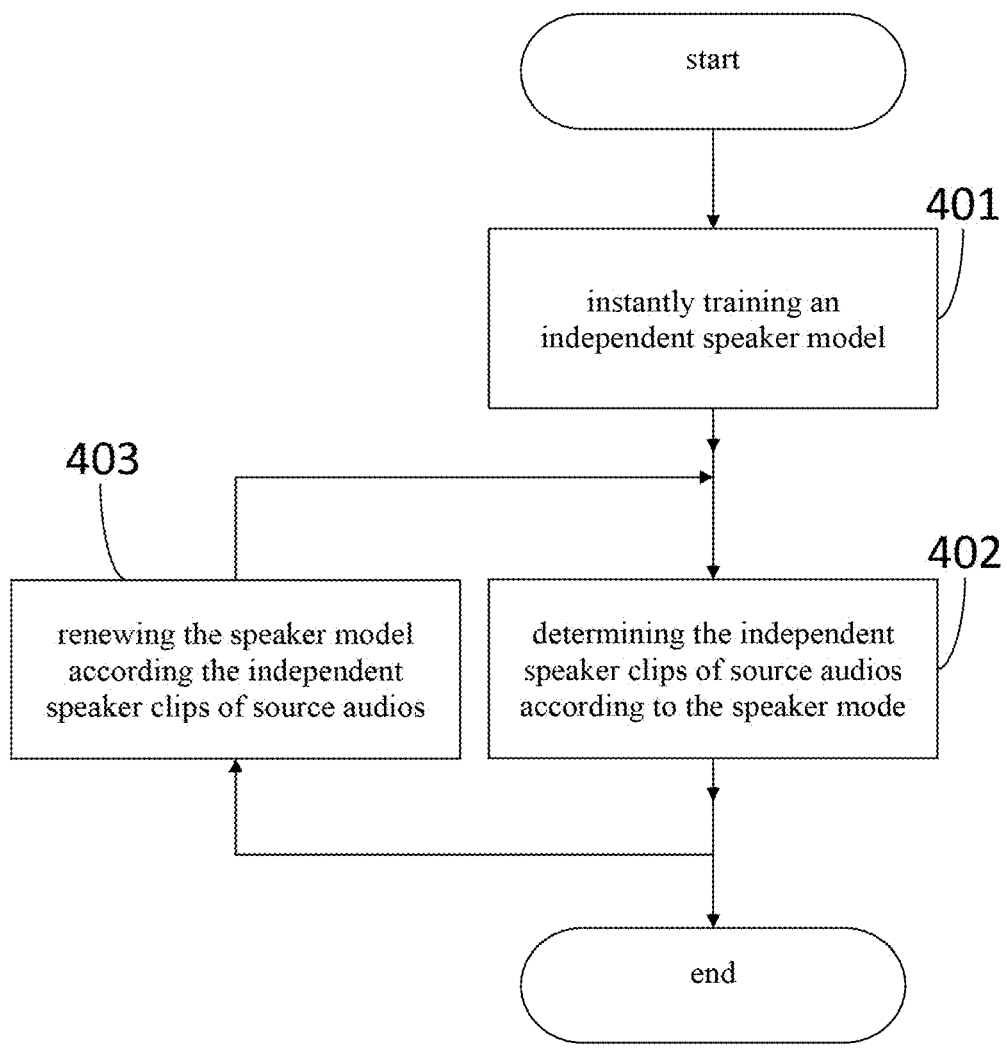
FIG. 4 shows a flow diagram of method of the present invention for segmenting video and audio into clips.

FIG. 4 shows a flow diagram of the method of the present invention for segmenting video and audio into clips. FIG. 4 shows instantly training an independent speaker model 401, determining the independent speaker clips of source audio according to the speaker model 402, and renewing the speaker model according the independent speaker clips of source audio 403. The step of instantly training an independent speaker model 401 is configured to instantly train the independent speaker model by retrieving a predetermined time length audio signal of a speaker from the source audio and then reading and training the speaker audio signals and training the speaker audio signals as the speaker audio model. The speaker model may comprise Guassian Mixture Model (GMM) and/or Hidden Markov Model (HMM). An audio signal with a predetermined time length is able to ensure that sufficient speaker related information is provided.

Figure 5:
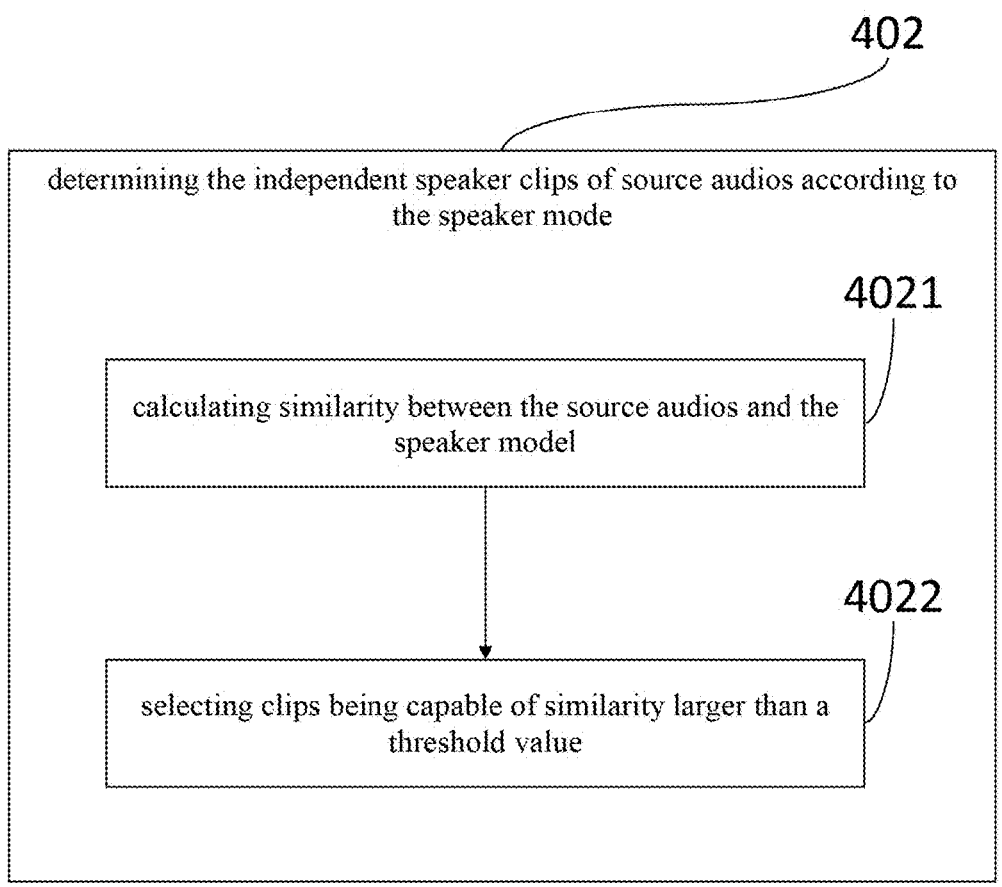
FIG. 5 shows a further flow diagram of the method of the present invention for segmenting video and audio into clips.

In the step of determining the independent speaker clips of source audio according to the speaker model 402, the length of the independent speaker clips of source audio may be longer than the length of the audio for training the speaker model. Further, the step of determining the independent speaker clips of source audio according to the speaker model 402 may comprise the steps of calculating similarity between the source audio and the speaker model 4021 and selecting clips being capable of similarity larger than a threshold value 4022 shown in FIG. 5. The step of calculating similarity between the source audio and the speaker model 4021 comprises but is not limited to the speaker model and is configured to calculate the probability of how similar the source audio is to the speaker model, according to the speaker model. In the step of selecting clips being capable of similarity larger than a threshold value 4022, the threshold value can be a manually determined value, and the amplitude of the threshold value would affect the selected time range of audio and video clips and the accuracy. In other words, when the threshold value is larger, the time range of the selected audio and video clips would be smaller.

In the step of renewing the speaker model according to the independent speaker clips of source audio 403, the present invention is configured to read speaker audio signals among the independent speaker clips and then train the speaker audio signals as the speaker model. The step of determining the independent speaker clips of source audio according to the speaker model 402, and the step of renewing the speaker model according the independent speaker clips of source audio 403, are able to be repeated in sequence. As the number of such repeats increases, more speaker audio signals can be obtained. The threshold value of the step of selecting clips being capable of similarity larger than a threshold value 4022 can then be increased as the number of the speaker audio signals increases. Also, the trained speaker model would be closer to the speaker's speaking characteristics and the accuracy of determining audio and video clips would increase as the number of speaker audio signals increases.

Figure 6:
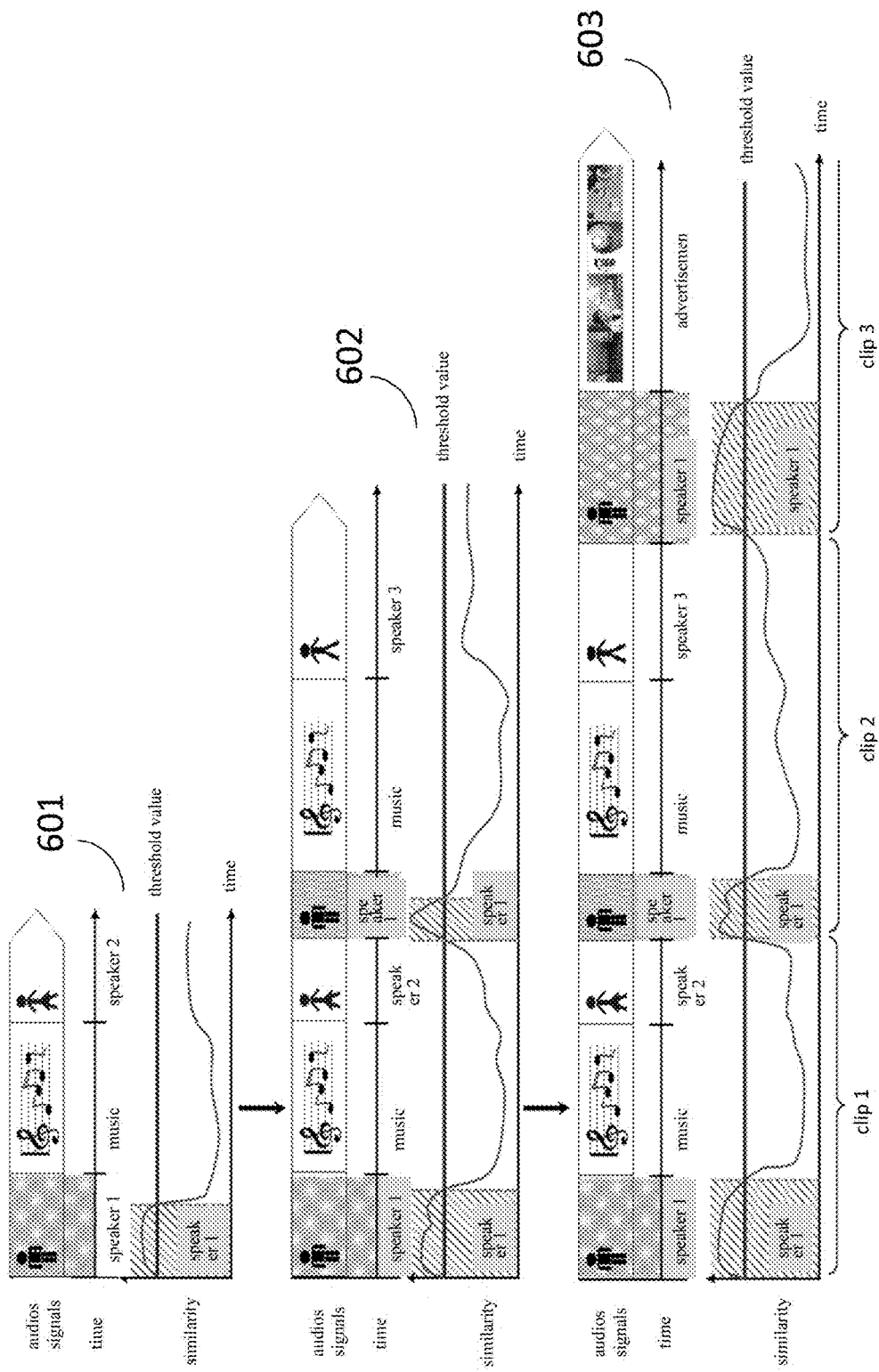
FIG. 6 shows the method of the present invention for determining the independent speaker clips of source audio.

In the method for segmenting video and audio into clips of the present invention, the method for determining the independent speaker clips of source audio is as shown in FIG. 6. As the source signals increase with time, the length of audio signal 602 is longer than the length of audio signal 601, and the length of audio signal 603 is longer than the length of audio signal 602. Audio signal 601 is the determined independent speaker segment after a first time processing of the step of determining the independent speaker clips of source audio according to the speaker model 402, and the plaid pattern means that the audio signal range has similarity larger than the threshold value, and the audio signal range is selected as the independent speaker clip. The step of renewing the speaker model according the independent speaker clips of source audio 403 is then processed to read the speaker audio signals among the independent speaker clip and then train the speaker audio signals as the independent speaker model. Audio signal 602 is two determined independent speaker clips after a second time processing of the step of determining the independent speaker clips of source audio according to the speaker model 402, and the plaid pattern means that the audio signal range has similarity larger than the threshold value, and the two audio signal ranges are selected as the independent speaker clips. The step of renewing the speaker model according to the independent speaker clips of source audio 403 is then processed to read the two speaker audio signals among the independent speaker clips and then train the two speaker audio signals as the independent speaker model, wherein the threshold value thereof can be different from the threshold value of the aforementioned first time processing. Audio signal 603 is three determined independent speaker clips after a third time processing of step of determining the independent speaker clips of source audio according to the speaker model 402, and the plaid pattern means that the audio signal range has similarity larger than the threshold value, and the three audio signal ranges are selected as the independent speaker clips. The step of renewing the speaker model according the independent speaker clips of source audio 403 is then processed to read the three speaker audio signals among the independent speaker clips and then train the three speaker audio signals as the independent speaker model, wherein the threshold value thereof can be different from the threshold value of the aforementioned first time and second time processing. As the unknown speaker source audio increases, the present invention is able to repeat the step of determining the independent speaker clips of source audio according to the speaker model 402, and the step of renewing the speaker model according to the independent speaker clips of source audio 403. The independent speaker clips can then increase in sequence, the speaker model can be instantly trained, and the speaker recognition can be applied to determine the audio and video clips.

Figure 7:
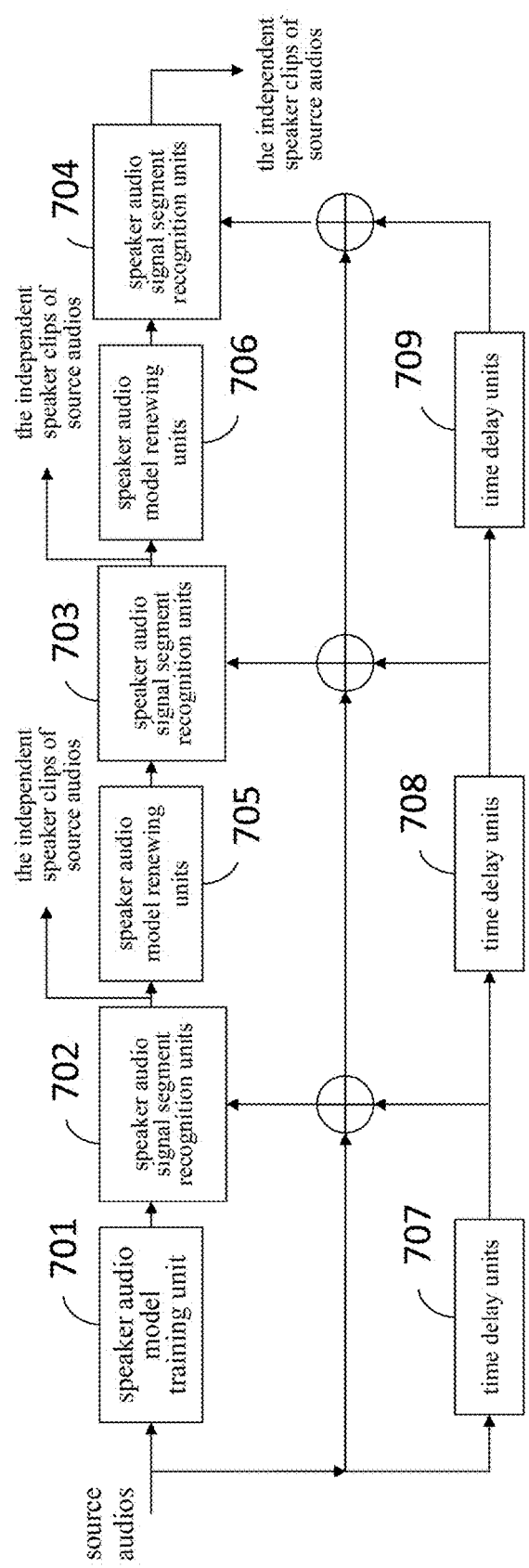
FIG. 7 shows an apparatus of the first embodiment of the present invention.

FIG. 7 shows an apparatus of the first embodiment of the present invention, comprising a speaker audio model training unit 701 configured to process the step of instantly training an independent speaker model 401, speaker audio signal segment recognition units 702-704 configured to process the step of determining the independent speaker clips of source audio according to the speaker model 402, speaker audio model renewing units 705-706 configured to process the step of renewing the speaker model according the independent speaker clips of source audio 403, and time delay units 707-709. The speaker audio model training unit 701 is configured to retrieve a predetermined time length audio signal of speaker from the source audio, and then read and train the speaker audio signals as the speaker audio model. The speaker audio signal segment recognition unit 702 is configured to process the step of determining the independent speaker clips of source audio according to the speaker model 402, wherein the length of the independent speaker clips of source audio may be longer than the length of the audio for training the speaker model. The speaker audio signal segment recognition unit is configured to receive the source audio signals and the delayed source audio signal generated by the time delay unit. By calculating the similarity between the source audio and the speaker model, clips being capable of similarity larger than a threshold value can be selected as the independent speaker clip of the source audio. The similarity calculation method comprises but is not limited to calculating the probability of how similar the source audio is to the speaker model, according to the speaker model. The independent speaker segment of the source audio can be inputted to the speaker audio model renewing unit 705 or be outputted as output clips. The speaker audio signal segment recognition unit 703 and speaker audio model renewing unit 706 are configured in the same manner. The speaker audio model renewing unit 705 is configured to read and train the outputted speaker audio signal of the independent speaker segment from the speaker audio signal segment recognition unit 702 as a new speaker model. The new speaker model is able to be inputted to the speaker audio signal segment recognition unit 703 as the reference for the next step of determining the independent speaker clips of source audio. The speaker audio signal segment recognition unit 704 and speaker audio model renewing unit 706 are configured in the same manner. As the number of the speaker audio signals for training the independent speaker model increases, the trained speaker model would be closer to the speaker's speaking characteristics and the accuracy of determining audio and video clips would increase.

Figure 8:
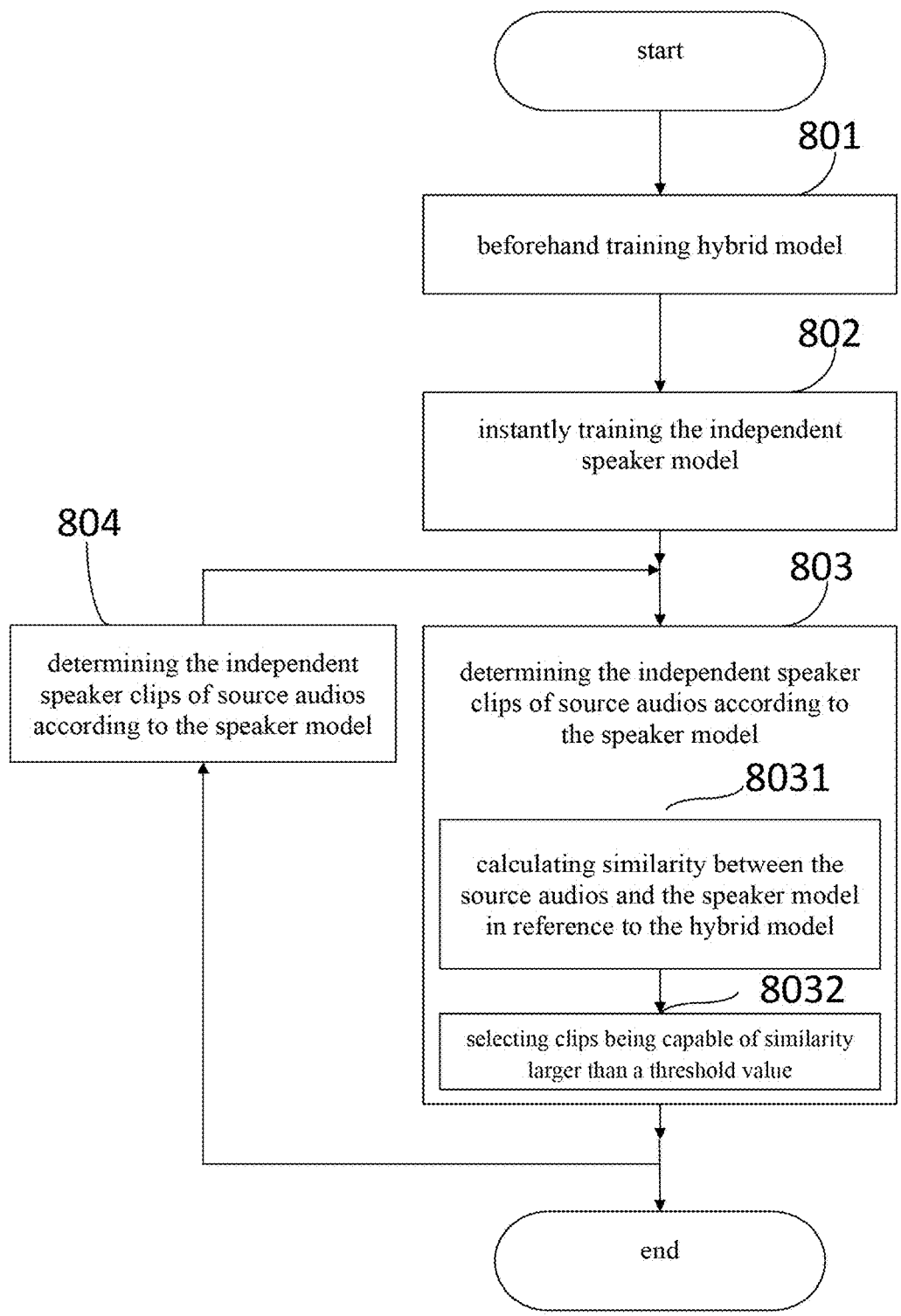
FIG. 8 shows the flow diagram of the second embodiment of the present invention.

FIG. 8 shows the flow diagram of the second embodiment of the present invention, comprising beforehand training hybrid model 801, instantly training the independent speaker model 802, determining the independent speaker clips of source audio according to the speaker model 803, and renewing the speaker model according to the independent speaker clips of source audio 804. The step of beforehand training hybrid model 801 is configured to retrieve arbitrary time interval hybrid audio signals of the non-source audio and then reading and training the hybrid audio signals as the hybrid model. Also, the hybrid audio signals comprise a plurality of speakers' audio signals, music audio signals, advertising audio signals, and audio signals of interviewing news video. The step of instantly training an independent speaker model 401 is configured to instantly train the independent speaker model by retrieving an audio signal of a speaker having a predetermined time length from the source audio, then reading and training the speaker audio signals, and training the speaker audio signals as the speaker audio model. The speaker model may comprise Guassian Mixture Model (GMM) and/or Hidden Markov Model (HMM). An audio signal with a predetermined time length is able to ensure that sufficient speaker related information is provided. The step of determining the independent speaker clips of source audio according to the speaker model 803 further comprises the steps of calculating similarity between the source audio and the speaker model in reference to the hybrid model 8031 and selecting clips being capable of similarity larger than a threshold value 8032. The step of calculating similarity between the source audio and the speaker model in reference to the hybrid model 8031 comprises but is not limited to calculating the similarity between the source audio and the speaker model and the similarity between the source audio and the hybrid model, respectively, based on the speaker model and the hybrid model, and then subtracting the later similarity from the previous similarity as below equation (1):

$$S(i)=S_a(i)-S_m(i) \qquad (1)$$

wherein S(i) represents, at ith time point, the similarity between the source audio and the speaker model in reference to the hybrid model, $S_a(i)$ represents at ith time point, the similarity between the source audio and the speaker model, and $S_m(i)$ represents, at ith time point, the similarity between the source audio and the hybrid model. The similarity between the source audio and the speaker model comprises the probability in log representing the similarity between the source audio and the speaker model. The similarity between the source audio and the hybrid model comprises the probability in log representing the similarity between the source audio and the hybrid model. Thus, the similarity between the source audio and the speaker model in reference to the hybrid model can also be expressed in probability as below equation (2):

$$S(i)=\exp(\log P_a(i)-\log P_m(i)) \qquad (2)$$

wherein $P_a(i)$ represents, at ith time point, the similarity expressed in probability between the source audio and the speaker model, $P_m(i)$ represents, at ith time point, the similarity expressed in probability between the source audio and the hybrid model. In the step of selecting clips being capable of similarity larger than a threshold value 8032, the threshold value can be a manually determined value, and the amplitude of the threshold value would affect the selected time range of audio and video clips and the accuracy. In other words, when the threshold value is larger, the time range of the selected audio and video clips would be smaller. The step of determining the independent speaker clips of source audio according to the speaker model 804 is configured to read speaker audio signals among the independent speaker clips and then train the speaker audio signals as the speaker model. The step of determining the independent speaker clips of source audio according to the speaker model 803 and the step of renewing the speaker model according the independent speaker clips of source audio 804 are able to be repeated in sequence. As the number of such repeats increases, more speaker audio signals can be obtained, and the threshold value of the step of selecting clips being capable of similarity larger than a threshold value 8032 can then be increased as the number of the speaker audio signals increases. Also, the trained speaker model would be closer to the speaker's speaking characteristics and the accuracy of determining audio and video clips would increase as the number of the speaker audio signals increases.

Figure 9:
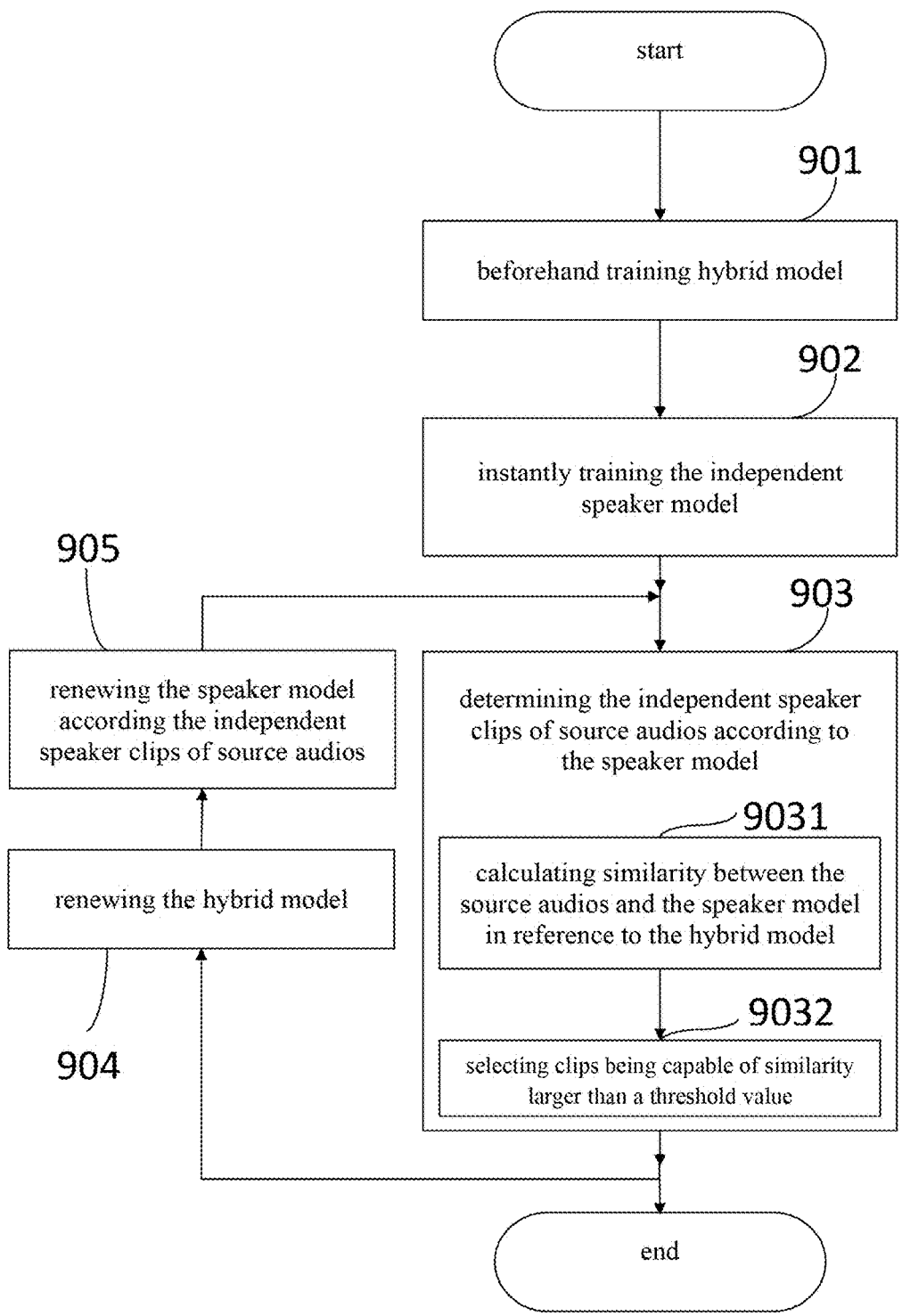
FIG. 9 shows the flow diagram of the third embodiment of the present invention.

FIG. 9 shows the flow diagram of the third embodiment of the present invention, comprising beforehand training hybrid model 901, instantly training the independent speaker model 902, determining the independent speaker clips of source audio according to the speaker model 903, renewing the hybrid model 904, and renewing the speaker model according to the independent speaker clips of source audio 905. The steps of beforehand training hybrid model 901, instantly training the independent speaker model 902, and determining the independent speaker clips of source audio according to the speaker model 903 can refer to the steps of beforehand training hybrid model 801, instantly training the independent speaker model 802, and determining the independent speaker clips of source audio according to the speaker model 803 in FIG. 8. The step of renewing the hybrid model 904 is configured to combine the hybrid audio signals which range between starting points of two segmented clips and the hybrid audio signal retrieved from the step of beforehand training hybrid model 901, and then train the hybrid audio signals as the hybrid model. Further, the hybrid audio signals comprise a plurality of speakers' audio signals, music audio signals, advertising audio signals, and audio signals of interviewing news video. The step of renewing the speaker model according the independent speaker clips of source audio 905 can refer to the step of renewing the speaker model according the independent speaker clips of source audio 804 in FIG. 8.

Figure 10:
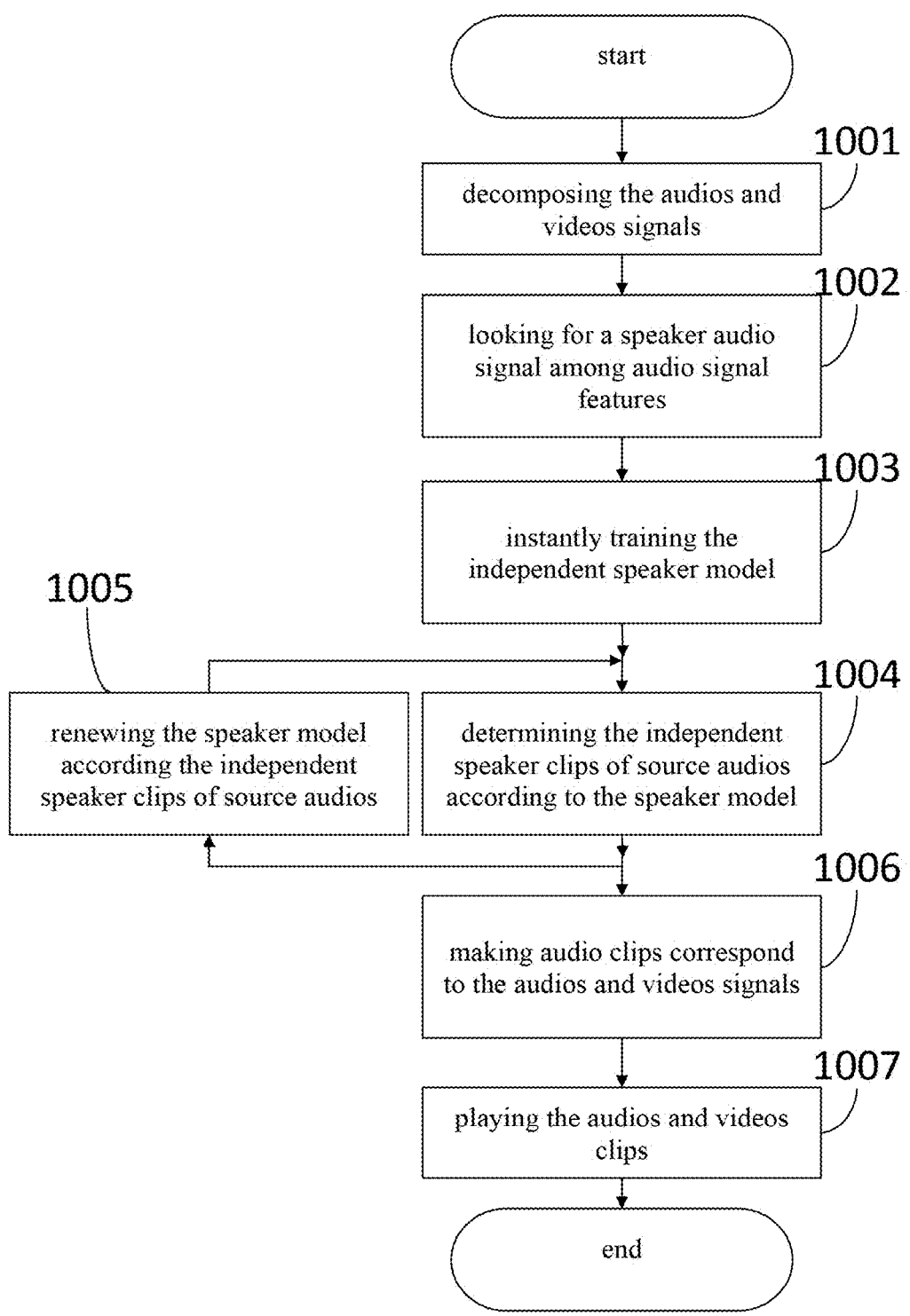
FIG. 10 shows the flow diagram of the forth embodiment of the present invention.

FIG. 10 shows the flow diagram of the forth embodiment of the present invention, comprising decomposing the audio and video signals 1001, looking for a speaker audio signal among audio signal features 1002, instantly training the independent speaker model 1003, determining the independent speaker clips of source audio according to the speaker model 1004, renewing the speaker model according the independent speaker clips of source audio 1005, making audio clips correspond to the audio and video signals 1006, and playing the audio and video clips 1007. The step of decomposing the audio and video signals 1001 is configured to decompose the audio and video signals into source audio and source video. The source audio only comprises voice signals or speaking signals, and the source video comprises image signals. The step of looking for a speaker audio signal among audio signal features 1002 is configured to look for the time position of the speaker audio signals by audio signal features usually occurring in most audio and video signals, and the audio signal features comprises cue tone, keyword, and music. The steps of instantly training the independent speaker model 1003, determining the independent speaker clips of source audio according to the speaker model 1004, renewing the speaker model according to the independent speaker clips of source audio 1005 can refer to the steps of instantly training the independent speaker model 401, determining the independent speaker clips of source audio according to the speaker model 402, and renewing the speaker model according the independent speaker clips of source audio 403 in FIG. 4. The step of making audio clips correspond to the audio and video signals 1006 is configured to make starting time code and ending time code of the audio clips to the audio and video signals, respectively, to generate audio and video clips, wherein the time code can be the absolute time carried by the audio and video signals, or the relative time counting from the starting point of the audio and video signals. The step of playing the audio and video clips 1007 is configured to play the corresponding audio and video clips in step of making audio clips correspond to the audio and video signals 1006.

Figure 11:
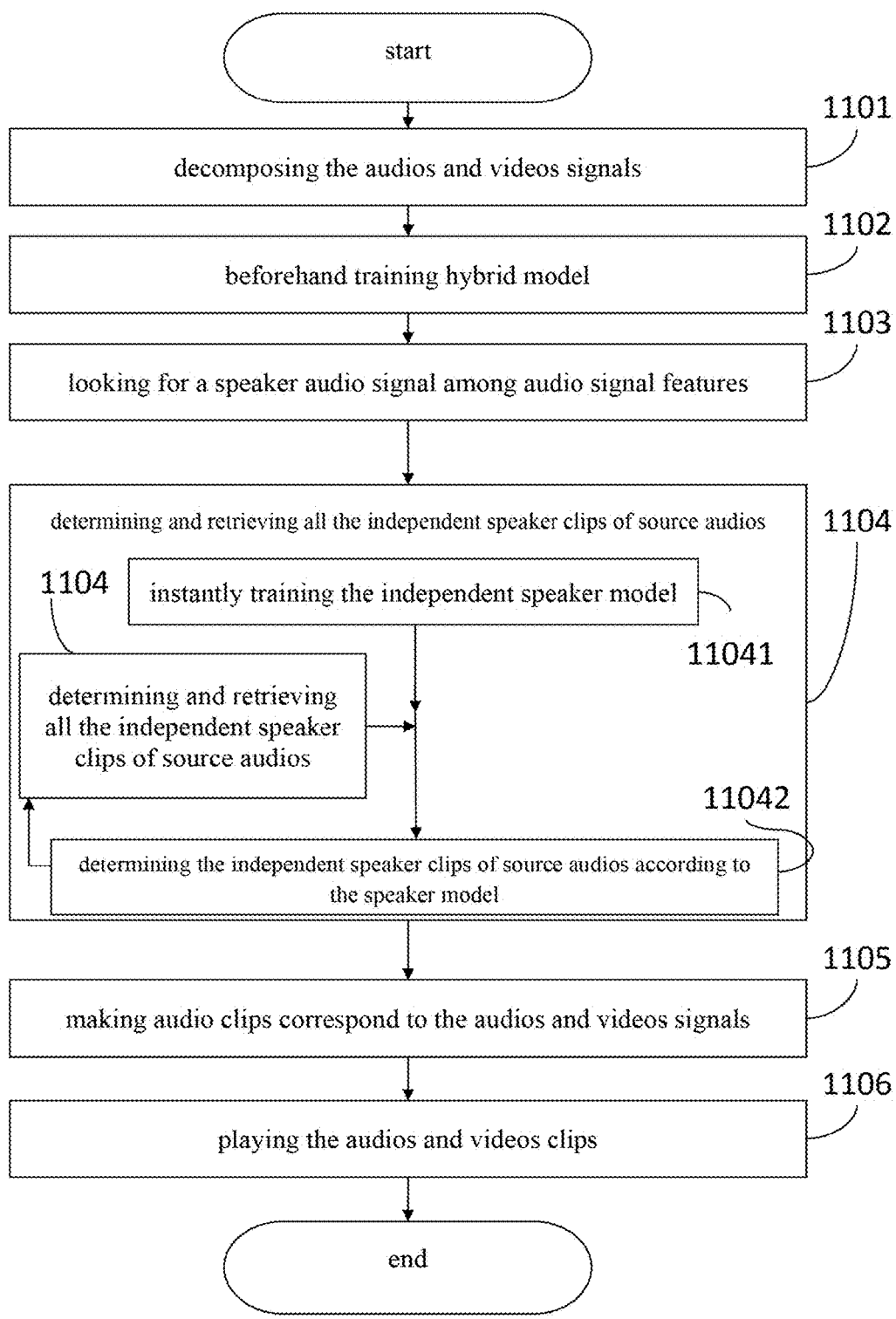
FIG. 11 shows the flow diagram of the fifth embodiment of the present invention.

FIG. 11 shows the flow diagram of the fifth embodiment of the present invention, comprising decomposing the audio and video signals 1101, beforehand training hybrid model 1102, looking for a speaker audio signal among audio signal features 1103, determining and retrieving all the independent speaker clips of source audio 1104, making audio clips correspond to the audio and video signals 1105, and playing the audio and video clips 1106. The step of decomposing the audio and video signals 1101 is configured to decompose the audio and video signals into source audio and source video. The source audio only comprises voice signals or speaking signals, and the source video comprises image signals. In the step of beforehand training hybrid model 1102, the trained hybrid model is derived from retrieving arbitrary time interval hybrid audio signals of the non-source audio and then reading and training the hybrid audio signals as the hybrid model. The hybrid audio signals comprise a plurality of speakers' audio signals, music audio signals, advertising audio signals, and audio signals of interviewing news video. The step of looking for a speaker audio signal among audio signal features 1103 is configured to look for a time position of the speaker audio signals by audio signal features usually occurring in most audio and video signals, and the audio signal features comprises cue tone, keyword, and music. The step of determining and retrieving all the independent speaker clips of source audio 1104 further comprises steps of instantly training the independent speaker model 11041, determining the independent speaker clips of source audio according to the speaker model 11042, and renewing the speaker model according the independent speaker clips of source audio 11043. The steps of instantly training the independent speaker model 11041, determining the independent speaker clips of source audio according to the speaker model 11042, and renewing the speaker model according the independent speaker clips of source audio 11043 can refer to instantly training the independent speaker model 802, determining the independent speaker clips of source audio according to the speaker model 803, and renewing the speaker model according the independent speaker clips of source audio 804 in FIG. 8. The steps of making audio clips correspond to the audio and video signals 1105 and playing the audio and video clips 1106 can refer to the steps of making audio clips correspond to the audio and video signals 1006 and playing the audio and video clips 1107 in FIG. 10.

Figure 12:
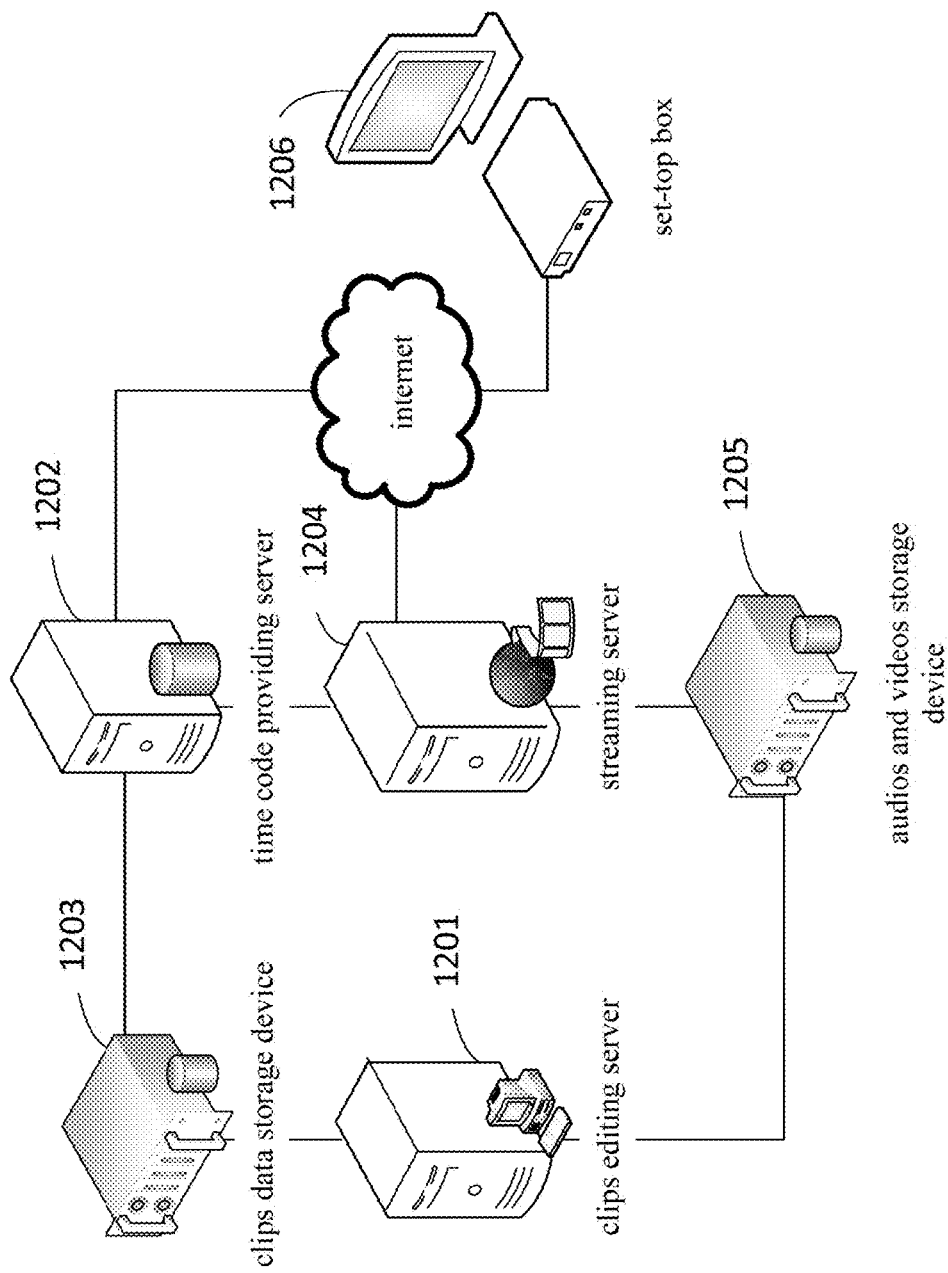
FIG. 12 shows the structure diagram of the sixth embodiment of the present invention.

FIG. 12 shows the system structure of the sixth embodiment of the present invention, comprising clips editing server 1201, time code providing server 1202, clips data storage device 1203, streaming server 1204, and audio and video storage device 1205. The clips editing server 1201 is configured to decompose the audio and video signals to retrieve the source audio signals, determine and retrieve all the independent speaker clips of source audio, and store starting time code and ending time code of all clips in the clips data storage device 1203. The clips editing server 1201 is configured to process the step of determining and retrieving all the independent speaker clips of source audio by the steps of instantly training an independent speaker model 401, determining the independent speaker clips of source audio according to the speaker model 402, and renewing the speaker model according the independent speaker clips of source audio 403. The time code providing server 1202 is configured to search the selected audio and video clips in the clips data storage device 1203 and retrieve the starting time code and ending time code of the selected clips. A set-top box 1206 is configured to be connected to the time code providing server 1202 via network and transmit request of playing the audio and video clips to the time code providing server 1202. After the time code providing server 1202 gets the starting time code and ending time code of the clips, it is configured to transmit the audio and video clips. One method for transmitting the audio and video clips is that the time code providing server 1202 would inform the streaming server 1204 of the starting time code and ending time code of the clips, and then configuring the streaming server 1204 to transmit the audio and video clips stored in the audio and video storage device 1205 to the set-top box 1206. The set-top box 1206 is configured to play the audio and video clips after receiving them. Another method for transmitting the audio and video clips is that the time code providing server 1202 is configured to transmit the starting time code and ending time code of the clips to the set-top box 1206, and the set-top box 1206 is configured to request that the streaming server 1204 transmit the audio and video clips stored in the audio and video storage device 1205. Also, the set-top box 1206 is configured to play the audio and video clips after receiving them.

Figure 13:
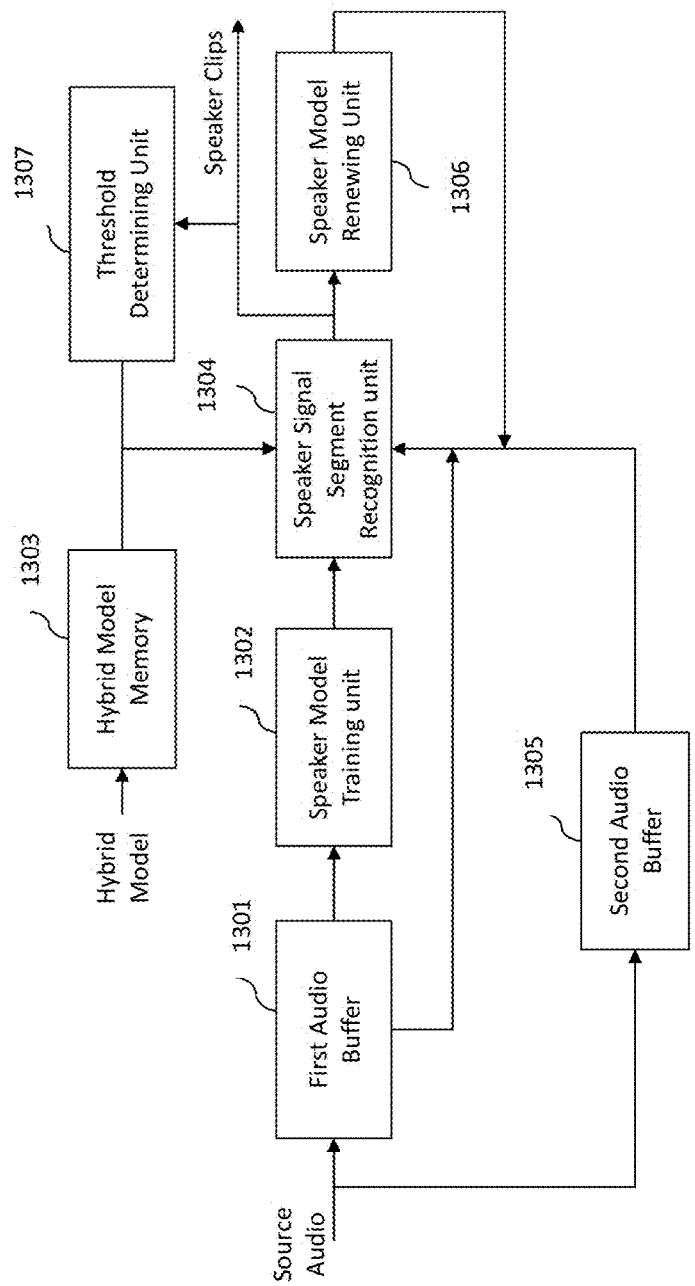
FIG. 13 shows the apparatus according to another embodiment of the present invention.

FIG. 13 shows an apparatus of the seventh embodiment of the present invention, comprising a first audio buffer 1301, a speaker model training unit 1302, a hybrid model memory 1303, a speaker signal segment recognition unit 1304, a second audio buffer 1305, a speaker model renewing unit 1306, and a threshold determining unit 1307. The first audio buffer 1301 receives source audio and keeps a predetermined time length audio signal of speaker from the start of source audio. The speaker model training unit 1302 retrieves the audio signal from the first audio buffer 1301, instantly trains a speaker model and outputs the speaker model. The hybrid model memory 1303 stores hybrid model, which is trained by use of speakers' audio signals, music audio signals, advertising audio signals, and audio signals of interviewing news video. The speaker signal segment recognition unit 1304 retrieves the audio signal from the first audio buffer 1301 and the second audio buffer 1305, the speaker model and the hybrid model, and then determines speaker clips of source audio and outputs the speaker clips. The speaker clips are determined by calculating the similarity between the audio signal and the speaker model and the similarity between the audio signal and the hybrid model, respectively, by subtracting the later similarity from the previous similarity and selecting clips with the similarity which is larger than a threshold. The second audio buffer 1305 keeps the audio signal during the time of training speaker model and determining speaker clips. The speaker model renewing unit 1306 receives the speaker clips, trains and renews the speaker model and outputs the speaker model. The threshold determining unit 1307 receives the speaker clips, outputs the threshold and determines the threshold, which increases along with the length of the speaker clips.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An apparatus for segmenting video and audio into clips, comprising:
   a first audio buffer that receives source audio and keeps a predetermined time length audio signal of speaker from the start of source audio;
   a speaker model training unit that retrieves the audio signal from the first audio buffer, instantly trains a speaker model and outputs the speaker model;
   a hybrid model memory that stores hybrid model which is trained by use of speakers' audio signals, music audio signals, advertising audio signals, and audio signals of interviewing news video;
   a speaker signal segment recognition unit that retrieves the audio signal from the first audio buffer and a second audio buffer, the speaker model and the hybrid model, determines speaker clips of source audio and outputs the speaker clips, wherein the speaker clips are determined by calculating the similarity between the audio signal and the speaker model and the similarity between the audio signal and the hybrid model, respectively, subtracting the later similarity from the previous similarity, and selecting clips with the similarity which is larger than a threshold, wherein the second audio buffer keeps the audio signal during the time of training speaker model and determines speaker clips;
   a speaker model renewing unit that receives the speaker clips, trains and renews the speaker model and outputs the speaker model; and
   a threshold determining unit that receives the speaker clips, outputs the threshold and determines the threshold, which increases along with the length of the speaker clips.

2. The apparatus for segmenting video and audio into clips of claim 1, wherein the video and audio clips are repeated video and audio clips corresponding to a speaker, and the video and audio clips range between starting points of the repeated video and audio clips corresponding to the speaker.

3. The apparatus for segmenting video and audio into clips of claim 1, wherein the video and audio clips comprise news video and the speaker model is a news anchor model.

4. A method for segmenting video and audio into clips, comprising:
   keeping a predetermined time length audio signal of speaker from the start of source audio in a first audio buffer;
   retrieving the audio signal from the first audio buffer and instantly training a speaker model;

storing hybrid model which is trained by use of speakers' audio signals, music audio signals, advertising audio signals, and audio signals of interviewing news video;

determining speaker clips of source audio and outputting the speaker clips by retrieving the audio signal from the first audio buffer and a second audio buffer, the speaker model and the hybrid model, calculating the similarity between the audio signal and the speaker model and the similarity between the audio signal and the hybrid model, respectively, subtracting the later similarity from the previous similarity, and selecting clips with the similarity that are larger than a threshold;

keeping the audio signal in the second audio buffer during the time of training speaker model and determining speaker clips;

renewing the speaker model by receiving the speaker clips and training the speaker model; and adjusting the threshold, wherein the threshold increases along with the length of the speaker clips.

* * * * *